United States Patent [19]

Libert et al.

[11] 3,940,941

[45] Mar. 2, 1976

[54] ANCHOR BOLTS FOR MINE ROOFS AND METHOD FOR INSTALLING SAME

[75] Inventors: Andre Libert, 8 rue des Pins, Crusnes; Gilbert Francois, 8 rue du Colonnel Bauret, Audun-le-Tiche, both of France

[73] Assignee: Acieries Reunies de Burbach-Eich-Dudelange S.A. ARBED, Audun-le-Tiche, France

[22] Filed: Apr. 1, 1974

[21] Appl. No.: 457,132

[30] Foreign Application Priority Data

Apr. 2, 1973   France............................... 73.11720

[52] U.S. Cl. ......................... 61/45 B; 85/1 R; 85/63
[51] Int. Cl.² ......................................... E21D 21/00
[58] Field of Search ................. 61/45 B; 85/1 R, 63

[56] References Cited
UNITED STATES PATENTS

| | | | |
|---|---|---|---|
| 3,244,055 | 4/1966 | Schuermann et al. ................. | 85/1 R |
| 3,693,359 | 9/1972 | Karara................................ | 61/45 B |

*Primary Examiner*—Robert L. Wolfe
*Assistant Examiner*—David H. Corbin
*Attorney, Agent, or Firm*—Karl F. Ross; Herbert Dubno

[57] ABSTRACT

To strengthen the roof of an underground passage such as an adit, drift or gallery of a mine, bores drilled from below into the roof are stuffed with frangible packages of interreacting components of a bonding agent which are subsequently pierced by the tips of anchor bolts introduced into these bores. Each anchor bolt terminates at its lower end in screw threads engaged by a nut which supports a washer, the threads being provided with a discontinuity preventing the detachment of the nut. During emplacement of each bolt, the nut is gripped by a rotating socket wrench which is turned under upward pressure first in a reverse or unscrewing direction, causing the nut to engage the discontinuity and to entrain the inserted bolt to pierce the packages and to stir their contents until the adhesive begins to set, and then in a forward or screw-tightening directing until the washer comes to rest against the roof surface under a pressure which tensions the sealed-in bolt against the surrounding roof structure.

4 Claims, 2 Drawing Figures

ANCHOR BOLTS FOR MINE ROOFS AND METHOD FOR INSTALLING SAME

FIELD OF THE INVENTION

Our present invention relates to a reinforcement for the roof of an underground passage, such as a level of a mine, and to a method of making such reinforcements.

BACKGROUND OF THE INVENTION

In order to steady the roof of a mine adit, drift or gallery against collapse, substantially vertical bores may be drilled from below into the overhead rock and may be stuffed with a sealant or bonding agent designed to anchor a set of bolts firmly in position therein, each of these bolts having a threaded lower extremity which projects from the roof surface and traverses a perforated retaining element such as a large washer which bears upon that surface under pressure of a nut screwed onto this threaded extremity. Bonding agents generally used for this purpose are of a multicomponent type, their several components including a hardenable mass such as a thermosetting resin, a curing agent therefor and, if desired, a catalyst and an accelerator. At least the hardenable mass, e.g. an epoxy resin, and the curing agent, e.g. an amine, must be separately packaged in frangible envelopes initially preventing their interaction. (See, for example, U.S. Pat. No. 2,982,396 and British Pat. No. 765,082.) Upon insertion of the bolt into a bore occupied by adhesive components so packaged, the envelopes are pierced and their contents intermingle so as to react with one another. To ensure a dependable bond, the mixture should be homogenized by vigorous agitation before setting. For this purpose, the inserted part of the bolt may be provided with a roughened surface, preferably in the form of a helicoidal groove, which upon rotation of the bolt has a stirring effect and which after the setting of the adhesive serves for more effective bonding.

If the lower end of the bolt has a polygonal head designed to facilitate its rotation, separate tools must be used to install each reinforcement, namely a first socket wrench fitting that head and a second socket wrench mating with the screw for tightening same against the retaining element after the bolt has been firmly emplaced. While the tools can be driven automatically, their interchange between the stirring and tightening steps is somewhat laborious and requires the intervention of an operator who may be exposed to the danger of falling rocks from a not yet consolidated roof portion.

Without such preliminary rotation, a reliable anchorage of the bolt in the overhead rock is difficult to attain even if the amount of adhesive is sufficient to fill the entire bore around the inserted bolt. If the lower end of the bolt is used to support a load, e.g. to serve as a point of attachment for a cable or the like, relative shifts between the bolt and the rock at that lower end tend to weaken the bond in that region so that the rock is liable to split around the bore, thereby seriously impairing the stability of the reinforcement.

OBJECTS OF THE INVENTION

The general object of our present invention, therefore, is to provide an improved reinforcement of this nature which avoids the aforestated disadvantages.

A related object is to provide a method of emplacing such a reinforcement in an efficient manner enabling the use of automatic equipment.

SUMMARY OF THE INVENTION

In a reinforcement according to our invention, a metallic bolt of the character described has the threads of its lower extremity provided with a discontinuity which arrests its nut upon rotation thereof in an unscrewing direction, i.e. counterclockwise as seen from below if right-hand threads are used. Thus, the bolt can be rotated counterclockwise through its nut, resting against that discontinuity, during the mixing step and thereafter remains in position as the bonding agent sets around it, allowing the nut to be rotated clockwise for tightening it to exert pressure upon the overlying retaining element. The two opposite rotations of the nut can be carried out with a single tool, e.g. a socket wrench engaging the nut; such a tool can thus be mounted on a remote-controlled reversible chuck exerting an upward thrust upon the nut in order to keep the bolt from dropping out of its bore.

Advantageously, the aforementioned discontinuity is provided in an intermediate zone of its screw threads so that another nut can detachably engage these threads below that discontinuity to facilitate the attachment of a load to the bolt.

According to a further feature of our invention, the roughened surface on the upper extremity of the bolt extends over only a minor fraction of the inserted length thereof, preferably between about 10 and 20 percent of that length. With proper dosing of the bonding agent to fill only the upper part of the bore surrounding that roughened surface, and with the remainder of the bolt smooth-surfaced down to its threaded lower extremity, the major part of the bolt will be free from any bond and can therefore be tensioned against its sealed-in upper end so as to stress the bolt as the nut is tightened. The bolt may be made of suitable steel having the desired degree of elasticity.

If the threads of the lower extremity and the helicoidal groove of the upper extremity of the bolt have pitch angles of like sign, as where both are in the form of right-handed helices, the reverse rotation (e.g. counterclockwise) of the nut during the stirring and homogenization phase will drive the surrounding mass upwardly in the bore so that the same is thoroughly masticated while being kept from descending along the stem of the bolt.

The deformation of the lower bolt extremity for creating the nut-arresting discontinuity can be carried out by various means, as by peripheral milling or by compression in a heated state. If no second nut is to be screwed onto that extremity, the discontinuity could be formed with the aid of a sledge-hammer at the very end of the bolt at normal temperatures.

BRIEF DESCRIPTION OF THE DRAWING

The above and other features of our invention will now be described in detail with reference to the accompanying drawing in which.

SPECIFIC DESCRIPTION

Figure 1:
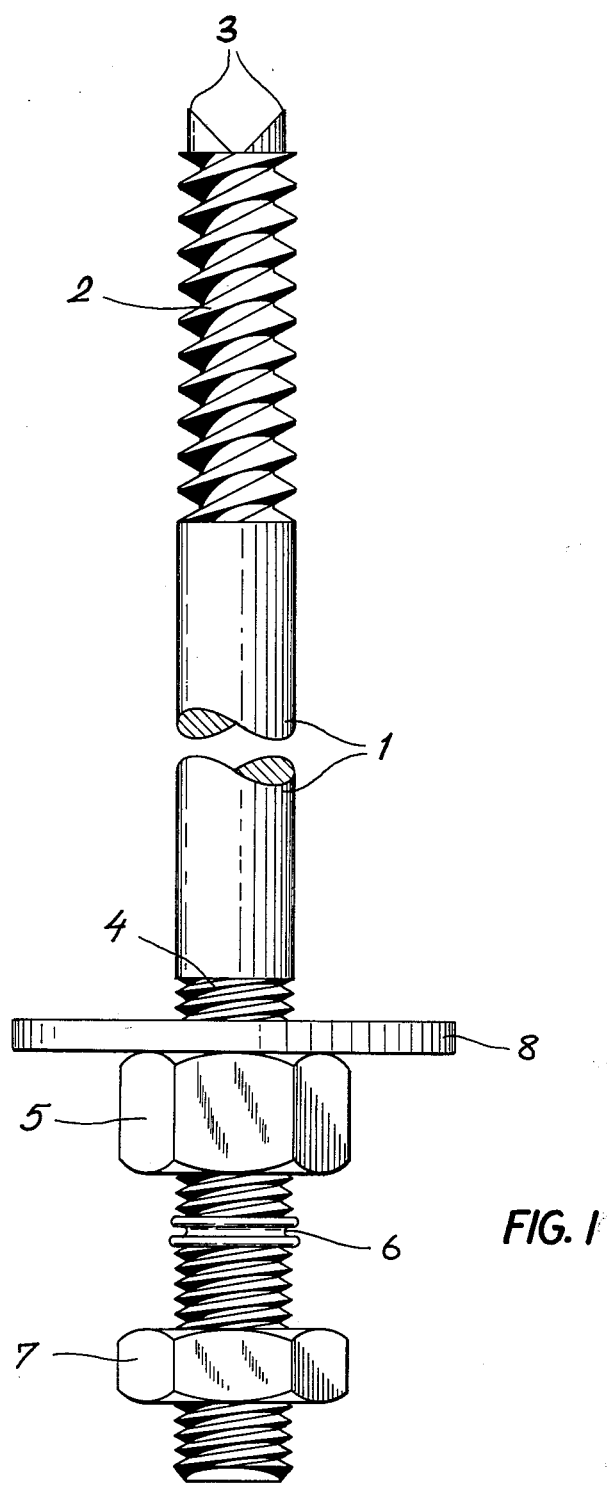
FIG. 1 is an elevational view of a bolt forming part of a reinforcement according to our invention.

In FIG. 1 we have shown a bolt 1 having a roughened upper extremity provided with a coarse helical groove 2 of the right-handed type. A transverse cut at the top of the bolt forms a pair of teeth 3 serving to pierce the walls of a plurality of generally cylindrical frangible packages 11, 12 with sealant components (FIG. 2) stuffed into a bore 10 of a mine roof which is to be strengthened in accordance with our present invention. The bolt tip could also be beveled or pointed for the same purpose.

The lower extremity of the bolt is provided with screw threads 4, also of the right-handed type, whose pitch angle is thus of the same sign as that of the helical groove 2 at the top. Between these two extremities the bolt 1 has a smooth cylindrical surface.

A washer 8 is traversed by the threaded lower extremity 4 of the bolt and rests on a nut 5 matingly engaging same. The descent of the nut is limited by a discontinuity 6, here in the shape of a milled annular groove, provided about midway along the threaded bolt portion 4. A second nut 7 engages the threads 4 below the discontinuity 6 and can be used to support a hook, a bracket or some other coupling element serving to attach a load to the bolt 1.

Figure 2:
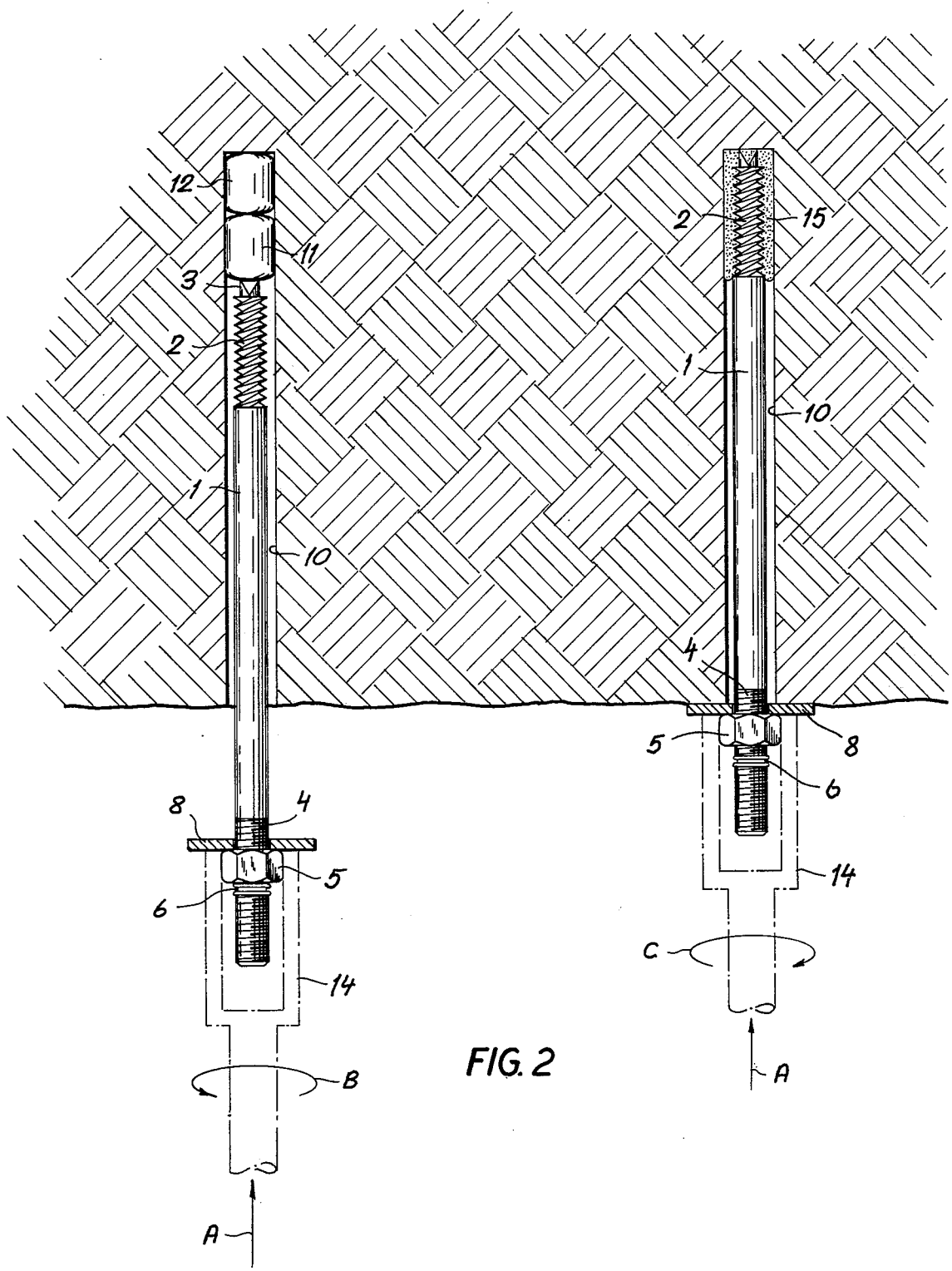
FIG. 2 is a fragmentary vertical section through the roof of a mine level provided with several reinforcements of the type shown in FIG. 1.

As shown in FIG. 2, the main nut 5 can be engaged by a socket wrench 14 mounted on a nonillustrated reversible chuck which exerts an upward thrust (arrow A) upon the nut and the bolt 1, thereby introducing the latter into a bore 10 for successive piercing of the packages 11 and 12 whose components thereupon begin to interact to form an adhesive 15. Instead of separate packages, a single package with a rupturable internal partition may be used. With counterclockwise rotation (arrow B) of nut 5 as seen from below, the nut descends along the threads 4 until it hits the discontinuity 6 whereupon the bolt 1 is entrained in the same direction so that its grooved upper extremity 2 shreds the packages 11 and 12 while stirring and homogenizing their contents as the bolt reaches its fully inserted position shown at right. The upward compaction of the adhesive mixture by the helically grooved surface 2 provides a solid bonding and sealing layer free from voids or gas pockets.

When the adhesive 15 has set and prevents further rotation of bolt 1 and nut 5 in the direction of arrow B, the drive of the chuck is reversed so that tool 14 now rotates in the opposite direction (arrow C) and threads the nut 5 upwardly until the washer 8 comes to rest against the underside of the roof structure. Rotation is then continued for a limited period until the resistance of the nut reaches a predetermined level, indicating that a desired tension has been imparted to the bolt 1. Washer 8 is now firmly held against the lower roof surface and the various rock strata of the roof are compressed by the stressed bolt.

The two-way rotation of the chuck carrying the tool 14 can be performed, for example, by a hydraulic servomotor preventing any overstressing of either the tool or the bolt.

In practice, the bolts 1 may have a length ranging between about 1.5 and 2 meters, with the groove 2 extending over approximately 20 cm; the threaded extremity 4 may be approximately 10 cm long. The diameter of the steel bolt may range between about 17 and 19 mm; bore 10 may have a diameter exceeding that of the bolt by about 4 to 8 mm.

Naturally, the washers 8 may be replaced by other perforated retaining elements serving to transfer the tensile stress of the bolts 1 to the surrounding roof structure.

We claim:

1. In an underground passage having a roof provided with at least one substantially vertical bore accommodating a reinforcement, the improvement wherein said reinforcement comprises:
    a metallic bolt having a threaded upper extremity inserted into said bore and a threaded lower extremity projecting from the bore;
    a hardenable mass of bonding agent surrounding said upper extremity of said bolt for anchoring same to the roof;
    a perforated retaining element surrounding said lower extremity outside said bore; and
    a nut engaging the threads of said lower extremity and bearing from below upon said element, thereby urging same under pressure against the roof surface and holding said bolt under tension, said lower extremity being provided with a discontinuity along the threads thereof spaced from said nut and disposed therebelow to prevent a detachment of said nut from said bolt whereby said nut is displaceable into contact with said discontinuity by an unscrewing motion enabling unidirectional rotation of said bolt by a nut-engaging tool to stir said bonding agent prior to hardening thereof.

2. The improvement defined in claim 1 wherein said threaded upper extremity extends over substantially 10 to 20 percent of the inserted length of said rod, said bolt being substantially smooth-surfaced between said extremities.

3. The improvement defined in claim 1 wherein said discontinuity is provided in an intermediate zone of said threads of said lower extremity, further comprising another nut detachably engaging said threads below said discontinuity.

4. The improvement defined in claim 1 wherein the threads of said upper and lower extremities have pitch angles of like sign.

* * * * *